United States Patent
Oh et al.

(10) Patent No.: US 9,520,240 B2
(45) Date of Patent: Dec. 13, 2016

(54) LITHIUM TITANIUM OXIDE (LTO)/CARBON COMPOSITE, PREPARATION METHOD FOR LTO/CARBON COMPOSITE, NEGATIVE ELECTRODE MATERIAL USING LTO/CARBON COMPOSITE, AND HYBRID SUPER CAPACITOR USING NEGATIVE ELECTRODE MATERIAL

(71) Applicant: SAMHWA CAPACITOR CO., LTD., Yongin-si (KR)

(72) Inventors: Young Joo Oh, Seoul (KR); Jung Rag Yoon, Yongin-si (KR); Kyung Min Lee, Paju-si (KR); Byung Gwan Lee, Osan-si (KR)

(73) Assignee: SAMHWA CAPACITOR CO., LTD. (KR)

( * ) Notice: Subject to any disclaimer, the term of this patent is extended or adjusted under 35 U.S.C. 154(b) by 266 days.

(21) Appl. No.: 14/262,030

(22) Filed: Apr. 25, 2014

(65) Prior Publication Data

US 2014/0328005 A1    Nov. 6, 2014

(30) Foreign Application Priority Data

May 3, 2013    (KR) .......................... 10-2013-0050069

(51) Int. Cl.
| | |
|---|---|
| *H01G 11/32* | (2013.01) |
| *H01M 4/48* | (2010.01) |
| *H01B 1/02* | (2006.01) |
| *H01B 1/18* | (2006.01) |
| *H01G 11/86* | (2013.01) |
| *H01G 11/46* | (2013.01) |
| *H01G 11/50* | (2013.01) |

(52) U.S. Cl.
CPC .............. *H01G 11/32* (2013.01); *H01G 11/46* (2013.01); *H01G 11/50* (2013.01); *H01G 11/86* (2013.01); *Y02E 60/13* (2013.01); *Y10T 428/2982* (2015.01)

(58) Field of Classification Search
CPC ......... H01G 11/32; H01G 11/46; H01G 11/50; H01G 11/86; Y10T 428/2982; Y02E 60/13
USPC ....................................................... 252/500
See application file for complete search history.

(56) References Cited

U.S. PATENT DOCUMENTS

| | | | |
|---|---|---|---|
| 8,029,934 B2 | 10/2011 | Haruna et al. | |
| 2004/0045818 A1* | 3/2004 | Inatomi ................ | H01M 4/137 204/291 |
| 2006/0222949 A1* | 10/2006 | Minamida ............. | H01M 4/133 429/231.1 |
| 2010/0178560 A1* | 7/2010 | Kim ......................... | H01B 1/08 429/217 |
| 2011/0091771 A1* | 4/2011 | Sannan ................... | C09D 5/002 429/217 |

(Continued)

FOREIGN PATENT DOCUMENTS

KR        1020110013460          2/2011

*Primary Examiner* — Mark Kopec
*Assistant Examiner* — Danny N Kang
(74) *Attorney, Agent, or Firm* — Cantor Colburn LLP (57) ABSTRACT

A lithium titanium oxide (LTO)/carbon composite, a preparation method for the LTO/carbon composite, a negative electrode material using the LTO/carbon composite, and a hybrid super capacitor using the negative electrode material are disclosed. The lithium titanium oxide (LTO)/carbon composite is formed to insert a carbon-based additive into a plurality of voids formed on the LTO granules, thereby improving the electrical conductivity.

8 Claims, 4 Drawing Sheets

(56) References Cited

U.S. PATENT DOCUMENTS

2011/0217593 A1\* 9/2011 Dollinger ............... B82Y 30/00
    429/231.1
2013/0052538 A1\* 2/2013 Pasta ..................... H01M 4/362
    429/245

\* cited by examiner

LITHIUM TITANIUM OXIDE (LTO)/CARBON COMPOSITE, PREPARATION METHOD FOR LTO/CARBON COMPOSITE, NEGATIVE ELECTRODE MATERIAL USING LTO/CARBON COMPOSITE, AND HYBRID SUPER CAPACITOR USING NEGATIVE ELECTRODE MATERIAL

CROSS-REFERENCE TO RELATED APPLICATION

This application claims the benefit of Korean Patent Application No. 10-2013-0050069, filed on May 3, 2013, in the Korean Intellectual Property Office, the disclosure of which is incorporated herein by reference.

BACKGROUND OF THE INVENTION

1. Field of the Invention

The present invention relates to a lithium titanium oxide (LTO)/carbon composite, a preparation method for the LTO/carbon composite, a negative electrode material using the LTO/carbon composite, and a hybrid super capacitor using the negative electrode material. More particularly, the present invention relates to a lithium titanium oxide (LTO)/carbon composite, a preparation method for the LTO/carbon composite, a negative electrode material using the LTO/carbon composite, and a hybrid super capacitor using the negative electrode material, where the LTO/carbon composite is formed to insert a carbon-based additive into a plurality of voids formed in the LTO granules, thereby improving the electrical conductivity.

2. Description of the Related Art

A hybrid super capacitor or a lithium secondary battery contains lithium titanium oxide (LTO) having a spinel structure, which is structurally stable, as a negative electrode material. The LTO advantageously has a high cycle property due to its zero-stain characteristic that almost no volume expansion occurs during the charging/discharging process. Hence, the LTO can be used as a negative electrode material required to have high output and long life span.

Korean Laid-Open Patent No. 2011 0013460 relates to a preparation method for LTO, which includes the steps of mixing a lithium carbonate powder or a lithium hydroxide powder with a titanium oxide used as a precursor for firing; using a compound containing titanium and lithium from a solution containing both titanium and lithium components as a precursor for firing; preparing a mixed slurry of a titanium compound powder and a lithium-containing compound; depositing the lithium compound through spray drying to prepare a mixture of the titanium compound powder and the lithium compound; and using the mixture as a precursor for firing.

The conventional LTO prepared as described in the Korean Laid-Open Patent No. 2011 0013460 is hard of high-speed charging/discharging because of its low electronic conductivity and disadvantageously has a low theoretical capacity of about 175 mAh/g. Further, electrodes using the conventional LTO tend to have a resistance increasing with an increase in the thickness. Thus, there is a need of performing a process for preparing a thin film to prevent this problem. This can lead to deterioration in the productivity for the product.

SUMMARY OF THE INVENTION

It is therefore an object of the present invention to solve the aforementioned problem and provide a lithium titanium oxide (LTO)/carbon composite, a preparation method for the LTO/carbon composite, a negative electrode material using the LTO/carbon composite, and a hybrid super capacitor using the negative electrode material, where the LTO/carbon composite is formed to insert a carbon-based additive into a plurality of voids formed in LTO granules, thereby improving the electrical conductivity.

It is another object of the present invention to provide a lithium titanium oxide (LTO)/carbon composite, a preparation method for the LTO/carbon composite, a negative electrode material using the LTO/carbon composite, and a hybrid super capacitor using the negative electrode material, where the LTO/carbon composite is formed to insert a carbon-based additive into a plurality of voids formed in LTO granules, thereby increasing the specific surface area to enhance the electrostatic capacity.

It is still another object of the present invention to provide a lithium titanium oxide (LTO)/carbon composite, a preparation method for the LTO/carbon composite, a negative electrode material using the LTO/carbon composite, and a hybrid super capacitor using the negative electrode material, where the LTO/carbon composite is formed to insert a carbon-based additive into a plurality of voids formed in LTO granules, thereby improving the output characteristic.

It is further another object of the present invention to provide a lithium titanium oxide (LTO)/carbon composite, a preparation method for the LTO/carbon composite, a negative electrode material using the LTO/carbon composite, and a hybrid super capacitor using the negative electrode material, where the LTO/carbon composite is formed to insert a carbon-based additive into a plurality of voids formed in LTO granules, thereby facilitating the preparation procedure of a negative electrode material to improve the productivity.

The LTO/carbon composite of the present invention is characterized by introducing a carbon-based additive into a plurality of voids formed in LTO granules.

The preparation method for LTO/carbon composite in accordance with one embodiment of the present invention includes the steps of preparing a mixed material; blending the mixed material using an ultrasound or mechanical method to prepare a mixture; drying the mixture by an oven drying method or a spray drying method to prepare a dried mixture; and performing a heat treatment on the dried mixture at 700 to 900° C. under the nitrogen ($N_2$) or argon (Ar) atmosphere to form LTO granules having a plurality of voids and introduce a carbon-based additive into a plurality of the voids in the LTO granules, where in the step of preparing the mixed material, the mixed material includes a plurality of lithium (Li) precursors, a plurality of titanium (Ti) precursors, and the carbon-based additive.

The preparation method for LTO/carbon composite in accordance with another embodiment of the present invention includes the steps of preparing a mixed material; blending the mixed material using an ultrasound or mechanical method to prepare a mixture; drying the mixture by an oven drying method or a spray drying method to prepare a dried mixture; performing a heat treatment on the dried mixture at 400 to 600° C. to form intermediate LTO granules having a plurality of voids; mixing intermediate LTO granules with a carbon aerogel to form a carbon aerogel mixture; and performing a heat treatment on the carbon aerogel mixture at 700 to 800° C. under the nitrogen (N) or argon (Ar) atmosphere to introduce a carbon-based additive into a plurality of voids in the intermediate LTO granules, where in the step of preparing the mixed material, the mixed material includes a plurality of lithium (Li) precursors and a plurality of titanium (Ti) precursors.

The negative electrode material of the present invention includes 80 to 90 wt. % of a LTO/carbon composite, 5 to 15 wt. % of a conductive agent, and 1 to 5 wt. % of a binder. The LTO/carbon composite is formed by performing a firing at 700 to 900° C. simultaneously on a plurality of lithium (Li) precursors, a plurality of titanium (Ti) precursors, and activated carbon or graphene used as the carbon-based additive to insert the carbon-based additive into the voids formed on the LTO granulates. The LTO granulates agglomerate to have a plurality of the primary LTO granules form a plurality of voids inside or on the outer surface of the LTO granulates through the firing.

The hybrid super capacitor of the present invention includes a reception case; a positive electrode arranged on the one side of the reception case and including a first current collector and a positive material member; a negative electrode arranged on the other side of the reception case to face the positive electrode in opposition and including a second current collector and a negative material member; an electrolyte filled in the reception case; and a separator arranged in the reception case and placed between the positive and negative electrodes. The positive material member is arranged in the front on the one side of the first current collector and formed from activated carbon. The negative material member is arranged in the front on the other side of the second current collector and formed from a negative electrode material including 80 to 90 wt. % of a LTO/carbon composite, 5 to 15 wt. % of a conductive agent, and 1 to 5 wt. % of a binder. The LTO/carbon composite is formed by performing a firing at 700 to 900° C. simultaneously on a plurality of lithium (Li) precursors, a plurality of titanium (Ti) precursors, and activated carbon or graphene used as the carbon-based additive to insert the carbon-based additive into the voids formed on the LTO granulates. The LTO granulates agglomerate to have a plurality of the primary LTO granules form a plurality of voids inside or on the outer surface of the LTO granulates through the firing.

The LTO/carbon composite, the preparation method for the LTO/carbon composite, the negative electrode material using the LTO/carbon composite, and the hybrid super capacitor using the negative electrode material according to the present invention contain a carbon-based additive introduced into a plurality of voids formed in the LTO granulates to improve the electrical conductivity, increase the specific surface area and hence the electrostatic capacity, improve the output characteristic, and make the production of a negative electrode material easier and thereby improve the productivity of the product.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a description will be given as to the embodiments of a lithium titanium oxide (LTO)/carbon composite, a preparation method for the LTO/carbon composite, a negative electrode material using the LTO/carbon composite, and a hybrid super capacitor using the negative electrode material with reference to the accompanying drawings.

Figure 1:
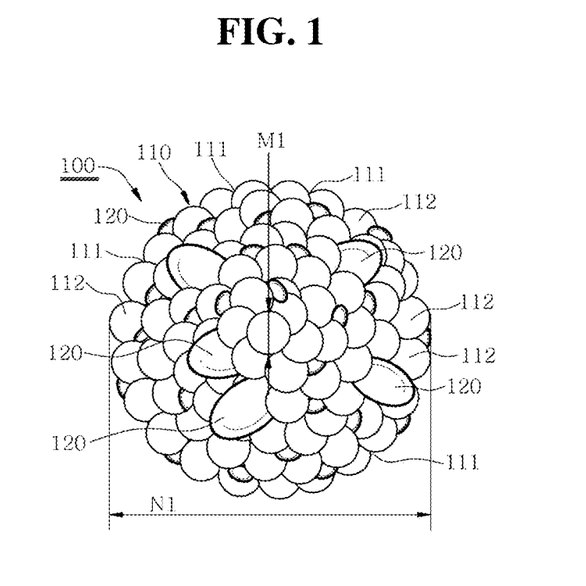
FIG. 1 is a front elevation of a LTO/carbon composite of the present invention.
Figure 2:
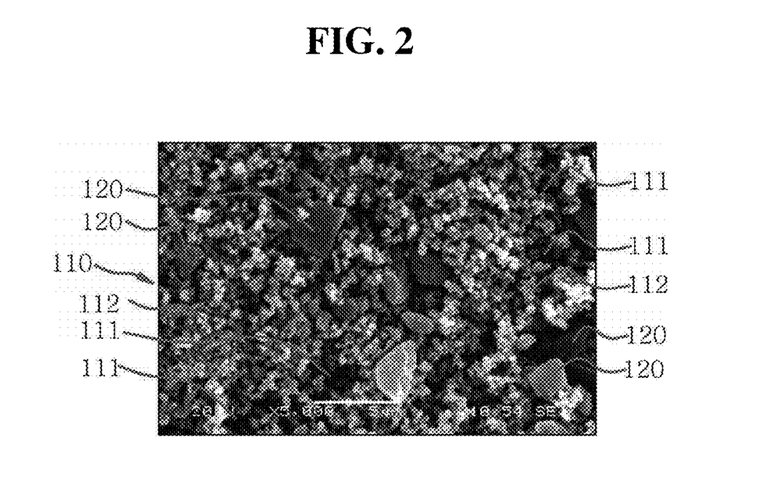
FIG. 2 is a partial enlarged image of the LTO/carbon composite shown in FIG. 1.

As shown in FIGS. 1 and 2, a LTO/carbon composite 100 of the present invention is formed to insert a carbon-based additive 120 into a plurality of voids 111 formed on LTO/carbon granules 110. The carbon-based additive 120 is at least one selected from activated carbon, graphene, and carbon aerogel and inserted into a plurality of voids 111 formed on the LTO/carbon granules 110 so that its content is 5 to 30 wt. % with respect to 100 wt. % of the LTO/carbon granules 110. In other words, the LTO/carbon composite of the present invention is composed of 70 to 95 wt. % of the LTO granules 110 and 5 to 30 wt. % of the carbon-based additive 120, and the carbon-based additive 120 is inserted into the voids formed in the LTO granules 110.

When using activated carbon or graphene as the carbon-based additive 120, the LTO/carbon composite 100 is formed by performing a firing at 700 to 900° C. simultaneously on a plurality of lithium (Li) precursors, a plurality of titanium (Ti) precursors, and activated carbon or graphene used as the carbon-based additive 120 to insert the carbon-based additive 120 into a plurality of voids 111 formed in the LTO granulates 110. In this regard, The LTO granulates 110 have a plurality of the primary LTO granules 112, which agglomerate through the firing to formed a plurality of voids 111 inside or on the outer surface of the LTO granulates 110. In other words, a plurality of voids 111 are generated while a plurality of the primary LTO granules 112 agglomerate through the firing. And, the carbon-based additive 120 is inserted into the LTO granulates 110 by performing a firing simultaneously on a plurality of lithium (Li) precursors, a plurality of titanium (Ti) precursors, and the carbon-based additive 120. A plurality of the primary LTO granules 112 are made of $Li_4Ti_5O_{12}$ and have a particle diameter ($D_{50}$: M1) of 50 to 400 and a specific surface area of 10 to 300 m²/g.

Figure 3:
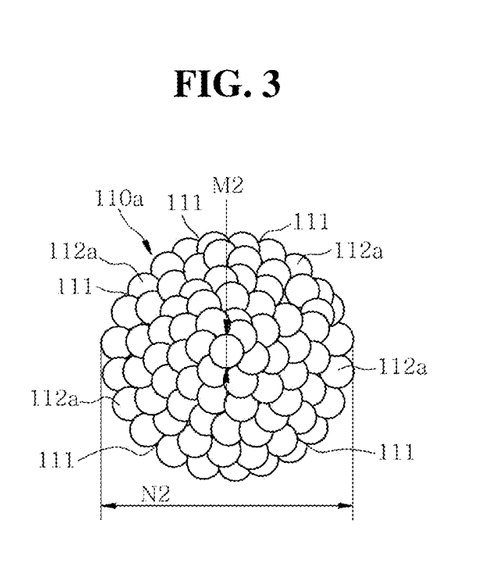
FIG. 3 is a front elevation of a Intermediate LTO granule that is another exemplary embodiment of the LTO granule shown in FIG. 1.

Even when using carbon aerogel as the carbon-based additive 120, the LTO/carbon composite 100 is formed, as illustrated in FIG. 3, by forming intermediate LTO granules 110a using a plurality of lithium (Li) precursors and a plurality of titanium (Ti) precursors and then performing a firing at 700 to 900° C. simultaneously on the intermediate LTO granulates 110a and the carbon aerogel. In other words, the intermediate LTO granulates 110a have a plurality of primary LTO granules 112a, which agglomerate through the firing to form a plurality of voids 111 inside or on the outer surface of the LTO granulates 110a. A plurality of the primary LTO granules 112a are made of $Li_2Ti_3$ and have a particle diameter ($D_{50}$:M2) of 30 to 100 nm and a specific surface area of 5 to 30 $m^2$/g.

When the LTO granules 110 and the primary LTO granules 112 and 112a used for the intermediate LTO granules 110a are compared in regards to the particle size ($D_{50}$:M1, M2), as shown in FIGS. 1 and 3, the particle size ($D_{50}$:M1) of a plurality of the primary LTO granules used for the LTO granules 110 of the LTO/carbon composite 100 using activated carbon or graphene as the carbon-based additive 120 is greater than the particle size ($D_{50}$:M2) of a plurality of the primary LTO granules 112a used for the intermediate LTO granules 110a of the LTO/carbon composite 100 using carbon aerogel as the carbon-based additive 120. Generally, the particle size ($D_{50}$:N1) of the LTO granules 110 and the particle size ($D_{50}$:N2) of the intermediate LTO granules 110a are in the range of 4 to 20.

Hereinafter, a description will be given as to a method for preparing the above-constructed LTO/carbon composite 100 according to one embodiment of the present invention as follows with reference to the accompanying drawings.

Figure 4:
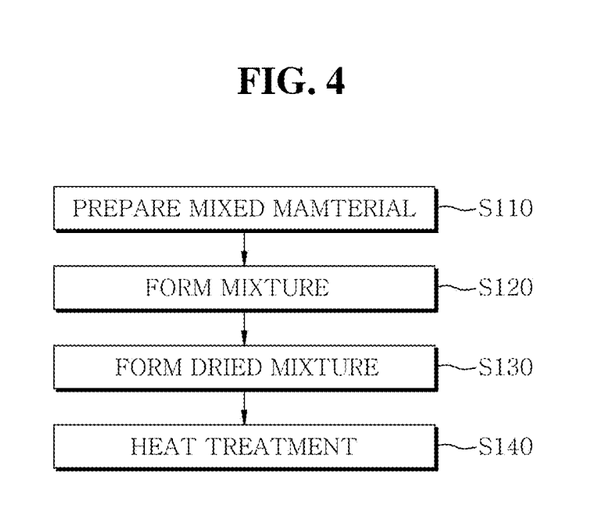
FIG. 4 is a flow chart showing a preparation method for LTO/carbon composite in accordance with one embodiment of the present invention.

The preparation method for LTO/carbon composite 100 according to one embodiment of the present invention is a method for preparing an LTO/carbon composite 100 using activated carbon or graphene as a carbon-based additive 120. As illustrated in FIG. 4, a mixed material is prepared (S110). The mixed material consists of a plurality of lithium (Li) precursors, a plurality of titanium (Ti) precursors, and the carbon-based additive 120. The Li precursors are either one of LiOH and $Li_2CO_3$, and the Ti precursors are any one of $TiO_2$, $TiO(OH)_2$, and $Ti(OCH_2CH_2O)$. The carbon-based additive 120 includes at least one selected from activated carbon and graphene. The activated carbon has a specific surface area of 1,000 to 2,500 $m^2$/g, and the graphene has a specific surface area of 2,000 to 2,600 $m^2$/g.

Once prepared, the mixed material is blended through the ultrasound or mechanical mixing method to form a mixture (S120). The mixture thus obtained is dried by the oven drying or spray drying method to form a dried mixture (S130). Out of the methods of drying the mixture into the dried mixture, the oven drying method using oven equipment (not shown) involves drying the mixture in an oven at 50 to 80° C. for 12 to 48 hours; and the spray drying method involves drying the mixture using two-fluid or four-fluid nozzle type spray drying equipment (not shown). The oven equipment or the two-fluid or four-fluid nozzle type spray drying equipment is known in the related art and will not be described any more.

The dried mixture thus obtained is subjected to a heat treatment, that is, fired at 700 to 900° C. under the nitrogen ($N_2$) or argon (Ar) atmosphere to form LTO granules 110 having a plurality of voids 111 as shown in FIG. 1 and insert the carbon-based additive 120 into a plurality of the voids 111 in the LTO granules 110, thereby completing the LTO/carbon composite 100 according to one embodiment of the present invention (S140). In this manner, a heat treatment conducted on the dried mixture makes the carbon-based additive 120 take the voids formed inside or on the outer surface of the LTO granules 110a to improve both the electrical conductivity and the specific surface area. This can lead to an increase in the electrostatic capacity when the LTO/carbon composite 100 is used for a negative electrode material.

A plurality of voids 111 in the LTO granules 110 taken by the carbon-based additive 120 are formed inside or on the outer surface of the LTO granules 110. If not shown in FIG. 1, the voids 111 inside the LTO granules 110a are formed while a plurality of primary LTO granules 112 constituting the LTO granules 110a agglomerate on the outer surface of the LTO granules 110. During this agglomeration process, the voids 111 into which the activated carbon or graphene used as the carbon-based additive 120 is inserted, that is, the voids 111 taken by the activated carbon or graphene can also be formed inside the LTO granules 110 in the same manner as on the outer surface of the LTO granules 110.

The heat treatment for preparation of the LTO/carbon composite 100 according to one embodiment of the present invention is conducted for 1 to 12 hours to make a plurality of primary LTO granules 112 (shown in FIG. 1) agglomerate and thereby form LTO granules 110 having a plurality of voids 111. The LTO granules 110 have a particle size ($D_{50}$:N1) (shown in FIG. 1) in the range of 4 to 20. The LTO granules 110 are formed in the step S130 of forming a dried mixture or the step S140 of inserting the carbon-based additive 120 into a plurality of voids 111 formed in the LTO granules 110. If the LTO granules 110 are formed in the step S130 of forming a dried mixture, it is preferably obtained by using the spray drying method to form LTO granules 110.

Figure 5:
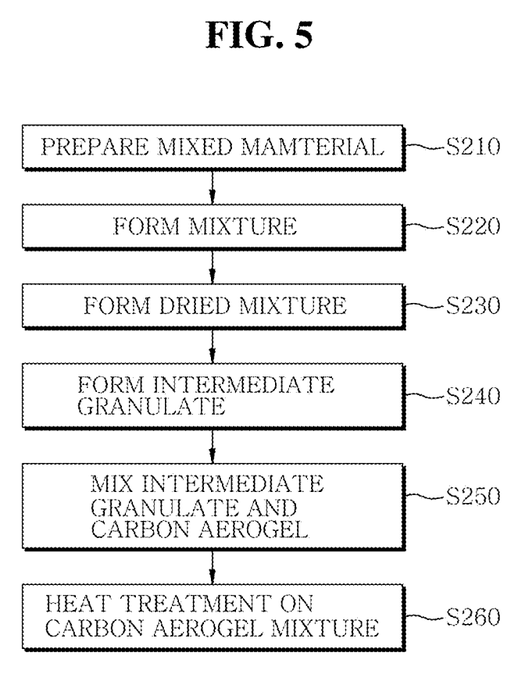
FIG. 5 is a flow chart showing a preparation method for LTO/carbon composite in accordance with another embodiment of the present invention.

The preparation method for LTO/carbon composite 100 according to another embodiment of the present invention is a method for preparing an LTO/carbon composite 100 using carbon aerogel as a carbon-based additive 120. As illustrated in FIG. 5, a mixed material is prepared (S210). The mixed material consists of a plurality of lithium (Li) precursors and a plurality of titanium (Ti) precursors. Once prepared, the mixed material is blended through the ultrasound or mechanical mixing method to form a mixture (S220).

The mixture thus obtained is dried by the spray drying method to form a dried mixture (S230). In drying the mixture, two-fluid or four-fluid nozzle type spray equipment is used. The dried mixture is then subjected to a heat treatment at 400 to 600° C. to form intermediate LTO granules 110a having a plurality of voids 111 as shown in FIG. 3 (S240). In other words, a plurality of primary LTO granules 112a are subjected to heat treatment, that is, firing for 1 to 12 hours to form intermediate LTO granules 110a having a plurality of voids 111 and a particle size ($D_{50}$:N2) of 4 to 20.

A plurality of voids 111 are formed inside or on the outer surface of the intermediate LTO granules 110a. If not shown in FIG. 3, the voids 111 are formed inside the intermediate LTO granules 110a while a plurality of primary LTO granules 112a constituting the intermediate LTO granules 110a agglomerate on the outer surface of the LTO granules 110. During this agglomeration process, the voids 111 into which the carbon aerogel used as the carbon-based additive 120 is inserted, that is, the voids 111 taken by the carbon aerogel can also be formed inside the intermediate LTO granules 110a in the same manner as on the outer surface of the intermediate LTO granules 110a.

Once the intermediate LTO granules 110a are formed, carbon aerogel is mixed with into the intermediate LTO granules 110a to form a carbon aerogel mixture (S250). In the step of forming the carbon aerogel mixture, the specific surface area of the carbon aerogel is 500 to 800 $m^2$/g on the intermediate LTO granules 110a. In mixing the carbon aerogel with the intermediate LTO granules 110a, the carbon aerogel is formed through a known method and then prepared in the form of a carbon aerogel sol. As the carbon aerogel in the form of a sol is mixed with the intermediate LTO granules 110a, a plurality of primary LTO granules 112a constituting the intermediate LTO granules 110a can be prevented from participating in the grain growth possibly caused by the firing at low temperature. The carbon aerogel sol and the intermediate LTO granules 110a are mixed together and then subjected to heat treatment, the carbon aerogel particles take the voids formed inside or on the outer surface of the granules. This can improve both the electrical conductivity and the specific surface area and thus increase the electrostatic capacity when the LTO/carbon composite is used for a negative electrode material.

As the carbon aerogel is mixed with the intermediate LTO granules 110a, the carbon aerogel mixture thus obtained is subjected to a heat treatment at 700 to 800° C. under the nitrogen ($N_2$) or argon (Ar) atmosphere to allow the carbon-based additive 120 inserted into a plurality of voids 111 in the intermediate LTO granules 110a (S260). The heat treatment for inserting the carbon-based additive 120 into a plurality of voids 111 in the intermediate LTO granules 110a is conducted for 1 to 12 hours to prepare an LTO/carbon composite 100 according to another embodiment of the present invention. In other words, the carbon aerogel is prepared in the form of a sol and mixed with the intermediate LTO granules 110a, so that it can penetrate into the voids 111 formed inside the intermediate LTO granules 110a. The carbon aerogel in this state is inserted into the voids in the intermediate LTO granules 110a through the firing process to take up the voids.

The negative electrode material using the above-constructed LTO/carbon composite 100 of the present invention consists of 80 to 90 wt. % of the LTO/carbon composite 100, 5 to 15 wt. % of a conductive agent, and 1 to 5 wt. % of a binder. The conductive agent is any one selected from acetylene black, denka black, and ketjen black. The binder is ethylene cellulose (EC). The LTO/carbon composite 100 is as prepared by the aforementioned preparation method and will not be described in further detail.

Figure 6:
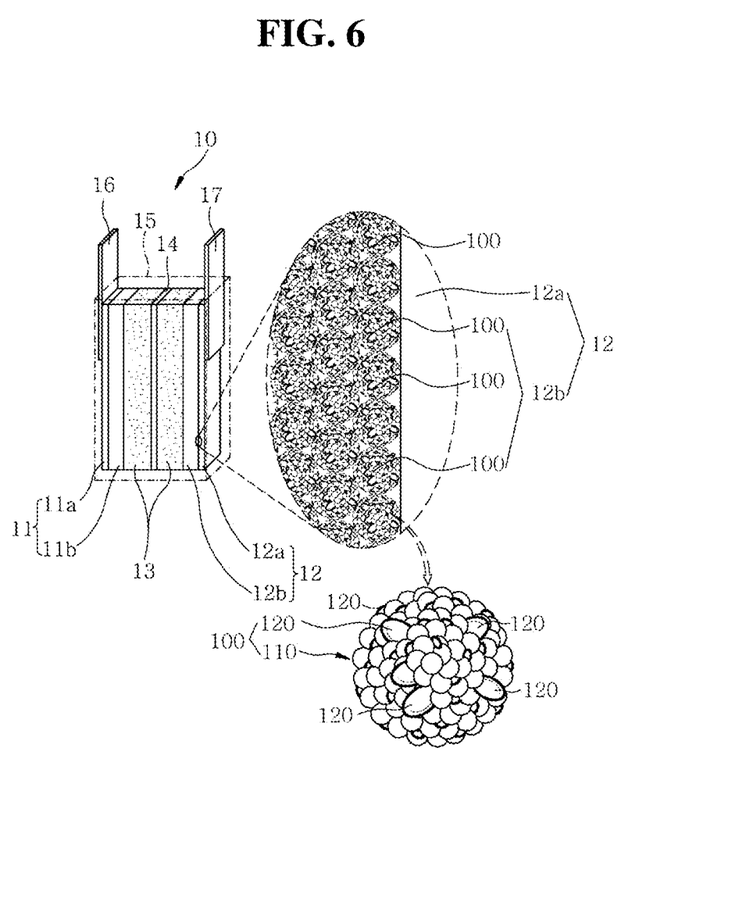
FIG. 6 is a cross-sectional view of a hybrid super capacitor using a negative electrode material prepared by using the LTO/carbon composite shown in FIG. 1.

As described above, the negative electrode material using the above-constructed LTO/carbon composite 100 of the present invention can enhance the electrical conductivity to 10 to 13 S/cm per unit length due to the use of the LTO/carbon composite 100 and improve the electrostatic capacity by using the specific surface area of the carbon-based additive 120, thereby improving the output characteristic of a secondary battery or a super capacitor 10 (illustrated in FIG. 6).

As the carbon-based additive 120, activated carbon is a carbon material that has micropores 2 to 50 nm in diameter as acquired through the activation process for a resin or high-quality corks at high temperature and a large specific surface area of 1,000 to 2,500 $m^2/g$. Further, the voids between the graphene particles function as a buffer against volume expansion/shrinkage of the electrode possibly occurring during the charging/discharging process to improve the cycle efficiency of the battery. The carbon aerogel used as the carbon-based additive 120 has the particles connected to one another with a 3-D network structure and shows an electrical conductivity of 20 to 30 S/cm, allowing a fast ion transfer and a large specific surface area of 500 to 800 $m^2/g$ to increase the electrostatic capacity.

Hereinafter, a description will be given as to a hybrid super capacitor 10 prepared using the negative electrode material using the LTD/carbon composite 100 according to the present invention with reference to the accompanying drawings as follows.

The hybrid super capacitor 10 of the present invention includes, as shown in FIG. 6, a positive electrode 11, a negative electrode 12, an electrolyte 13, a separator 14, a reception case 15, and lead members 16 and 17.

The positive electrode is arranged on the one side of the reception case 1 and consists of a first current collector 11a and a positive electrode material member 11b. The positive electrode material member 11b is formed from activated carbon and arranged in the front on the one side of the first current collector 11a. The negative electrode 12 is arranged on the other side of the reception case 15 to face the positive electrode 11 and consists of a second current collector 12a and a negative electrode material member 12b. The negative electrode material member 12b is positioned in the front on the other side of the second current collector and formed from the negative electrode material of the present invention. The composition of the negative electrode material is as described above and will not be described in further detail.

The electrolyte 13 is filled in the reception case 15 and includes a mixture prepared by mixing a salt and an additive with an organic solvent.

The organic solvent as used herein may include at least one selected from acetonitrile (ACN), ethylene carbonate (EC), propylene carbonate (PC), dimethyl carbonate (DMC), diethyl carbonate (DEC), ethylmethyl carbonate (EMC), 1,2-dimethoxyethane (DME), γ-buthrolactone (GBL), methyl formate (MF), and methyl propionate (MP).

The salt as used herein has a concentration of 0.8 to 2M and consists of a lithium (Li) salt and a non-lithium salt. The lithium (Li) salt is susceptible to the insertion/leaving reaction into/from the LTO granulates 110 and includes any one selected from $LiBF_4$, $LiPF_6$, $LiClO_4$, $LiAsF_6$, $LiAlCl_4$, $LiCF_3SO_3$, $LiN(SO_2CF_3)_2$, $LiC(SO_2CF_3)_3$, and LiBOB (lithium bis(oxalate)borate). The non-lithium salt is susceptible to the absorption/leaving reaction and used at a concentration of 0 to 0.5M in combination with the lithium (Li) salt. The non-lithium salt includes any one selected from tetraethylammonium tetrafluoroborate ($TEABF_4$), triethylmethylammonium tetrafluoroborate ($TEMABF_4$), and spiro-(1,1')-bipyrrolidium tetrafluoroborate ($SBPBF_4$).

The additive as used herein is used in an amount of 0 to 5 wt. % with respect to 100 wt. % of the electrolyte 13 and includes at least one selected from vinylene carbonate (VC), vinyl ethylene carbonate (VEC), and fluoroethylene carbonate (FEC).

The separator 14 is arranged inside the reception case 15 to position between the positive electrode 11 and the negative electrode 12 to prevent an electrical short circuit occurring when the positive electrode 11 and the negative electrode 12 are in physical contact with each other. The separator 14 is a porous separator. The porous separator includes any one of polypropylenes, polyethylenes, and polyolefins. The lead members 16 and 17 are connected to the first current collector 11a of the positive electrode 11 and the second current collector 12a of the negative electrode 12, respectively.

The above-constructed hybrid super capacitor of the present invention can enhance the electrical conductivity by having a negative electrode material using the ITO/carbon composite 100 of the present invention as a negative electrode material member 12b and improve the electrostatic capacity by using the specific surface area of the carbon-based additive 120, thereby improving the output characteristic. This can be applied to the lithium secondary battery as well as the hybrid super capacitor prepared by using the negative electrode material including the LTO/carbon composite of the present invention.

The LTO/carbon composite, the preparation method for the LTO/carbon composite, the negative electrode material using the LTO/carbon composite, and the hybrid super capacitor using the negative electrode material according to the present invention contain a carbon-based additive introduced into a plurality of voids formed in the LTO granulates to improve the electrical conductivity, increase the specific surface area and hence the electrostatic capacity, improve the output characteristic, and make the production of a negative electrode material easier and thereby improve the productivity of the product.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A lithium titanium oxide (LTO)/carbon composite comprising:
    an LTO granule agglomerate composed of a plurality of LTO granules, the LTO granule agglomerate having a plurality of voids between neighboring LTO granules, the LTO granules being made of $Li_4Ti_5O_{12}$, and having a particle diameter of 50 to 400 nm and a specific surface area of 10 to 300 $m^2/g$; and
    a carbon-based additive inserted into the voids, the carbon-based additive comprising at least one selected from the group consisting of activated carbon, graphene and carbon aerogel.

2. The LTO/carbon composite as claimed in claim 1, wherein the LTO/carbon composite comprises 70 to 95 wt. % of the LTO granules and 5 to 30 wt. % of the carbon-based additive.

3. The LTO/carbon composite as claimed in claim 1, wherein the LTO/carbon composite is formed by performing a firing at 700 to 900° C. simultaneously on a plurality of lithium (Li) precursors, a plurality of titanium (Ti) precursors, and the activated carbon or the graphene.

4. The LTO/carbon composite as claimed in claim 1, wherein the LTO/carbon composite is formed by forming intermediate LTO granules using a plurality of lithium (Li) precursors and a plurality of titanium (Ti) precursors and then performing a firing at 700 to 900° C. simultaneously on the intermediate LTO granules and the carbon aerogel.

5. A negative electrode material comprising: 80 to 90 wt. % of a lithium titanium oxide (LTO)/carbon composite according to claim 1, 5 to 15 wt. % of a conductive agent, and 1 to 5 wt. % of a binder.

6. The negative electrode material as claimed in claim 5, wherein the conductive agent comprises any one selected from the group consisting of super-P, acetylene black, denka black, and ketjen black.

7. A hybrid super capacitor comprising:
    a reception case;
    a positive electrode arranged on one side of the reception case and comprising a first current collector and a positive electrode material member;
    a negative electrode arranged on the other side of the reception case to face the positive electrode and comprising a second current collector and a negative electrode material member;
    an electrolyte filled in the reception case; and
    a partition arranged in the reception case and positioned between the positive electrode and the negative electrode,
    wherein the positive electrode material member is arranged in a front on the one side of the first current collector and formed from activated carbon,
    wherein the negative electrode material member is arranged in a front on the other side of the second current collector and formed from a negative electrode material according to claim 5.

8. The hybrid super capacitor as claimed in claim 7, wherein the electrolyte includes a mixture of a salt and an additive with an organic solvent,
    wherein the organic solvent comprises at least one selected from the group consisting of acetonitrile (ACN), ethylene carbonate (EC), propylene carbonate (PC), dimethyl carbonate (DMC), diethyl carbonate (DEC), ethylmethyl carbonate (EMC), 1,2-dimethoxyethane (DME), γ-buthrolactone (GBL), methyl formate (MF), and methyl propionate (MP),
    wherein the salt is prepared by mixing a lithium (Li) salt and a non-lithium salt,
    wherein the lithium (Li) salt comprises any one selected from the group consisting of $LiBF_4$, $LiPF_6$, $LiClO_4$, $LiAsF_6$, $LiAlCl_4$, $LiCF_3SO_3$, $LiN(SO_2CF_3)_2$, $LiC(SO_2CF_3)_3$, and LiBOB (lithium bis(oxalate)borate),
    wherein the non-lithium salt comprises any one selected from the group consisting of tetraethylammonium tetrafluoroborate ($TEABF_4$), triethylmethylammonium tetrafluoroborate ($TEMABF_4$), and spiro-(1,1')-bipyrrolidium tetrafluoroborate ($SBPBF_4$),
    wherein the additive comprises at least one selected from the group consisting of vinylene carbonate (VC), vinyl ethylene carbonate (VEC), and fluoroethylene carbonate (FEC).

* * * * *